United States Patent
Koshino

(10) Patent No.: US 6,337,990 B1
(45) Date of Patent: Jan. 8, 2002

(54) MOBILE COMMUNICATIONS APPARATUS AND INTERMITTENT RECEIVING CONTROL METHOD

(75) Inventor: Masayuki Koshino, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/358,763

(22) Filed: Jul. 22, 1999

(30) Foreign Application Priority Data

Apr. 22, 1999 (WO) .................................. PCT/JP99/2130

(51) Int. Cl.[7] .................................................. H04B 1/38
(52) U.S. Cl. ........................................ 455/574; 455/343
(58) Field of Search ................................. 455/422, 450, 455/550, 573, 574, 575, 231, 343, 517, 456, 457

(56) References Cited

U.S. PATENT DOCUMENTS

| | | | |
|---|---|---|---|
| 5,140,589 A | * 8/1992 | Otsuka | 455/231 |
| 5,649,315 A | * 7/1997 | Eaton | 455/343 |
| 9,247,358 | 2/1999 | Borgeson et al. | |

FOREIGN PATENT DOCUMENTS

| | | |
|---|---|---|
| JP | 6244782 | 9/1994 |
| JP | 7326998 | 12/1995 |
| JP | 9261160 | 10/1997 |

OTHER PUBLICATIONS

U.S. application No. 09/247,358, Borgeson et al., filed Feb. 10, 1999.

* cited by examiner

*Primary Examiner*—Thanh Cong Le
(74) *Attorney, Agent, or Firm*—Rothwell, Figg, Ernst & Manbeck

(57) ABSTRACT

A mobile communications apparatus includes a receiving processor for intermittently receiving a radio signal, and for extracting from the radio signal location information about a reference point in a visited cell; a distance calculator for obtaining a distance from the mobile communications apparatus to the reference point; a distance comparator for comparing two different distances obtained by the distance calculator; and an intermittent ratio controller for controlling an intermittent ratio of the receiving processor in response to an output of the distance comparator. This makes it possible for the mobile communications apparatus to control the intermittent ratio on the basis of the moving direction relative to the cell.

8 Claims, 8 Drawing Sheets

MOBILE COMMUNICATIONS APPARATUS AND INTERMITTENT RECEIVING CONTROL METHOD

BACKGROUND OF THE INVENTION

1. Field of the Invention

The present invention relates to a mobile communication apparatus and an intermittent receiving control method, and more particularly to a mobile communications apparatus and an intermittent receiving control method capable of reducing power consumption by performing variable control of an intermittent ratio of receiving in standby mode.

2. Description of Related Art

Generally, mobile communications apparatuses such as mobile phones carry power supplies in the form of batteries. Accordingly, it is necessary for them to reduce their power consumption in the standby mode to prolong the battery life. To achieve this, their receiving stages operate not continuously but intermittently at fixed time intervals in the standby mode so as to receive radio signals from mobile communications networks.

The ratio of the receiving operation time to the standby time in the intermittent reception is referred to as an intermittent ratio. Reducing the intermittent ratio can reduce the power consumption. However, if the intermittent ratio is too small, it becomes difficult for the mobile communications apparatuses to receive enough system information from the mobile communications network. For example, when a mobile communications apparatus moves across neighboring cells, it cannot achieve proper handover but for the sufficient system information.

Thus, various mobile communications apparatuses have been conventionally proposed which reduce power consumption by carrying out variable control of the intermittent ratio in accordance with radio environments. Such mobile communications apparatuses are proposed, for example, in Japanese patent application laid-open Nos. 4-322523/1992 and 9-261153/1997.

The former discloses a mobile communications apparatus that reduces its power consumption by varying the intermittent ratio in accordance with the size of a visited cell informed from a base station. Generally, as the size of the visited cell increases, the probability also increases for the mobile communications apparatus to be present in the same cell. However, when the mobile communications apparatus is on a periphery of the cell, it sometimes cannot select an appropriate intermittent ratio. In addition, in a small visited cell, the mobile communications apparatus cannot reduce the intermittent ratio in accordance with its moving speed, and hence cannot reduce power consumption.

The latter discloses a mobile communications apparatus that increases the intermittent ratio when a good receiving condition continues for a fixed time interval, and reduces the intermittent ratio when the receiving condition is bad. However, the receiving condition does not always correspond to the distance to the cell center. Furthermore, the good receiving condition in the past does not necessarily promise a good receiving condition in the future.

In particular, when the mobile communications apparatus moves fast, or when the cell itself moves as in a satellite communications system, the positional relationships between the mobile communications apparatus and the cell varies greatly, resulting in frequent occurrence of the handover. In addition, when the cell itself moves, because the relationships between the visited cell and its neighboring cells varies from time to time, the system information also changes every moment.

Thus, if it is possible to predict the future positional relationships between the mobile communications apparatus and the visited cell, and to variably control the intermittent ratio in response to the prediction, the proper system information can be obtained with reduced power consumption.

SUMMARY OF THE INVENTION

According to a first aspect of the present invention, there is provided a mobile communications apparatus comprising: a receiving processor for intermittently receiving a radio signal, and for extracting from the radio signal location information about a reference point in a visited cell; a distance calculator for obtaining a distance from the mobile communications apparatus to the reference point; a distance comparator for comparing distances obtained by the distance calculator; and an intermittent ratio controller for controlling an intermittent ratio of the receiving processor in response to an output of the distance comparator. With such an arrangement, the mobile communications apparatus can detect the changes in the distance to the reference point in the visited cell, and control the intermittent ratio of the receiving processor in response to the detected result.

Here, the intermittent ratio controller may reduce the intermittent ratio of the receiving processor when the distance comparator outputs a signal indicative of reduction in the distance over a predetermined time period. This makes it possible to prevent the fluctuations in the intermittent ratio.

According to a second aspect of the present invention, there is provided an intermittent receiving control method comprising: a receiving step of intermittently receiving a radio signal; an extracting step of extracting, from the radio signal received, location information about a reference point in a visited cell; a distance obtaining step of obtaining a distance from a mobile communications apparatus to the reference point; a distance comparing step of comparing distances obtained by the distance obtaining step; and an intermittent ratio controlling step of controlling an intermittent ratio of the receiving step in response to a comparing result. This makes it possible to detect the changes in the distance from the mobile communications apparatus to the reference point in the visited cell, and to control the intermittent ratio of the receiving operation by the mobile communications apparatus in response to the detected result.

DETAILED DESCRIPTION OF THE PREFERRED EMBODIMENTS

The invention will now be described with reference to the accompanying drawings.

EMBODIMENT 1

Figure 1:
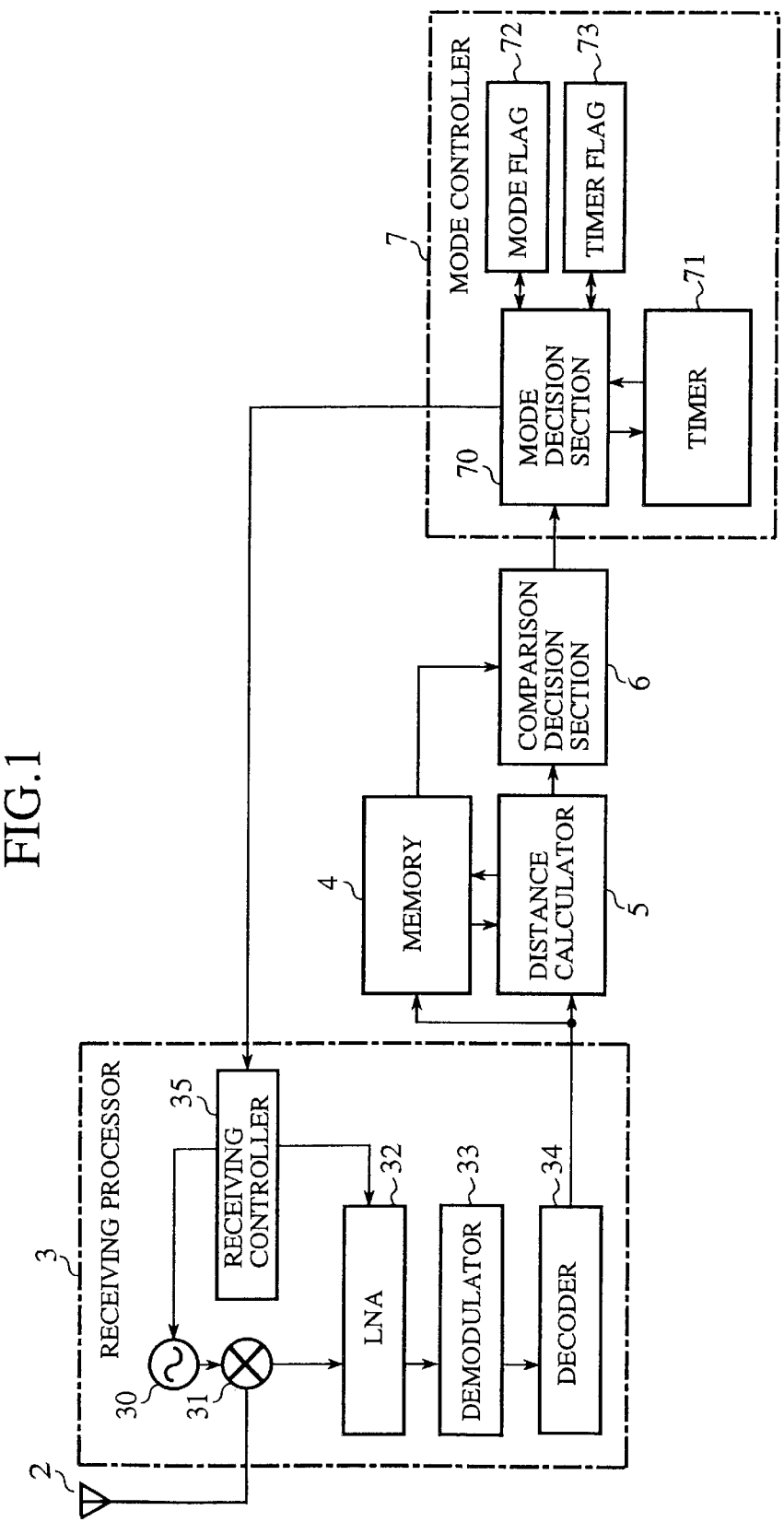
FIG. 1 is a block diagram showing an embodiment 1 of a mobile communications apparatus 1A in accordance with the present invention.

FIG. 1 is a block diagram showing an embodiment 1 of a mobile communications apparatus in accordance with the present invention. The mobile communications apparatus 1A comprises an antenna 2, a receiving processor 3, a memory 4, a distance calculator 5, a comparison decision section 6 and a mode controller 7.

A radio signal sent from a base station or from a communications satellite is received by the antenna 2 and is supplied to the receiving processor 3. The radio frequency signal from the antenna 2 is multiplied in a mixer 31 by a local signal fed from a local oscillator 30 to be converted into a baseband signal. The baseband signal is amplified by a LNA (Low Noise Amplifier) 32, followed by demodulation by a demodulator 33 and decoding by a decoder 34. The decoder 34 extracts a couple of information from the baseband signal.

The first information extracted by the decoder 34 is position information (reference point information) of a reference point in a visited cell. A cell is defined as a geographic area covered by a single radio signal, and a visited cell is a cell in which the mobile communications apparatus 1A is present and carries out the location registration.

A reference point is a predetermined position close to the center of a cell, that is, a location separated apart from the cell edges by more than a predetermined distance, and is preferably determined as a point about the center or its neighboring in a circle-like or polygon-like cell. For example, in the satellite communications system, because the received signal strength is greatest near the center of the cell, that point or its neighboring point can be adopted as the reference point.

The radio signal transmitted regularly by the base station or communications satellite includes a broadcast channel (BCCH) which bears the system information about the cell. The system information includes the reference point information, and the receiving processor 3 extracts from the BCCH the reference point information and supplies it to the distance calculator 5.

The decoder 34 extracts as its second information the location information (mobile station information) of the mobile communications apparatus 1A. The mobile station information is sent from the base station or from the communications satellite in response to the request from the mobile communications apparatus 1A. For example, the geographic location of the mobile communications apparatus 1A can be identified by receiving at a plurality of base stations or communications satellites a request signal sent from the mobile communications apparatus, and by applying in a control center the principle of the triangulation to receiving strengths of the request signal. The mobile station information thus obtained is transmitted to the mobile communications apparatus 1A from the base station or communications satellite.

The receiving processor 3 extracts the mobile station information from the radio signal received after the transmission of the request signal, and writes it into the memory 4. When the mobile communications apparatus 1A is a self-location identifying type with a detector that receives a transmitted signal from a GPS (global positioning system) satellite, for example, and detects the location information, and moving distance and direction of the mobile communications apparatus 1A itself, the mobile station information is generated from the detected signal and is written into the memory 4. Alternatively, a configuration can be implemented that corrects the mobile station information extracted by the receiving processor 3 from the memory 4 in accordance with the detected information.

The distance calculator 5 includes an arithmetical unit for carrying out calculation based on the reference point information fed from the receiving processor 3 and the mobile station information stored in the memory 4, and obtains the distance from the mobile communications apparatus 1A to the reference point. For instance, when the mobile station information and reference point information are both represented in terms of latitude and longitude, the distance between the mobile station and the reference point can be obtained by calculating the differences in the latitude and longitude, respectively, and by obtaining the root of the square sum of the differences. The distance thus obtained is stored in the memory 4. The distance calculator 5 carries out the calculation every time the receiving processor 3 receives the BCCH.

The comparison decision section 6 comprises a comparator for comparing the distance fed from the distance calculator 5 with the distance stored in the memory 4. This means that the comparison decision section 6 compares the distances at different times because the distance stored in the memory 4 is the distance obtained in the past by the distance calculator 5.

The comparison decision section 6 outputs a first decision signal or a second decision signal in response to the change in the distance from the reference point. Specifically, comparing the previous distance with the current distance, the comparison decision section 6 outputs the first decision signal when the previous distance is greater than the current distance, and the second decision signal when the current distance is greater than the previous distance.

The decision signals indicate the moving direction of the mobile communications apparatus 1A with respect to the reference point. A transition to a power saving mode which will be described later is implemented unless the distance from the reference point increases. The first decision signal is a condition satisfied signal indicating that the condition is fulfilled, whereas the second decision signal is a condition unsatisfied signal indicating that the condition is not fulfilled.

The mode controller 7 selects, in response to the output of the comparison decision section 6, either a normal mode or the power waving mode, and supplies the receiving processor 3 with a mode control signal. The power saving mode is defined as a mode that reduces the power consumption by decreasing the intermittent ratio of the receiving operation in the standby mode as compared with that in the normal mode. The mode control signal output from the mode controller 7 is supplied to a receiving controller 35 in the receiving processor 3.

The receiving controller 35, which carries out the intermittent control of the operation of the local oscillator 30 and the LNA 32, performs variable control of the intermittent ratio in response to the mode control signal, such that the intermittent ratio increases in the normal mode, and decreases in the power saving mode. It is preferable that the demodulator 33 and decoder 34 also undergo the variable intermittent control by the receiving controller 35, although their power consumption is smaller.

The mode controller 7 comprises a mode decision section 70, a timer 71, a mode flag 72 and a timer flag 73. The mode decision section 70 supplies the timer 71 with a start signal and a stop signal, and makes a decision of the mode in response to the decision signal fed from the comparison decision section 6 and the time-up signal fed from the timer 71. The mode flag 72 holds the mode selected by the mode decision section 70, and the timer flag 73 holds the operation state of the timer 71.

The timer 71 starts its operation in response to the start signal, and outputs the time-up signal after operating a predetermined time period. If the timer 71 receives the stop signal during its operation, it clears its count data and stops its operation.

When the comparison decision section 6 outputs the first decision signal, the mode decision section 70 outputs the start signal to activate the timer 71. In contrast, when the comparison decision section 6 outputs the second decision signal, it outputs the stop signal to stop the timer 71. Accordingly, when only the first decision signal is continuously output, the timer 71 outputs the time-up signal.

The mode decision section 70 switches to the power saving mode in response to the time-up signal in the normal mode, and switches back to the normal mode in response to the second decision signal in the power saving mode. In the mode switching, the mode decision section 70 writes the new mode into the mode flag 72, and outputs the mode control signal. In addition, it writes into the timer flag 73 "operate" or "halt" when the timer is operating or halting.

The memory 4, mode flag 72 and timer flag 73 can be integrally configured using a rewritable memory such as a semiconductor memory like a DRAM, SRAM and flash ROM.

Generally, the receiving processor 3 excluding the mixer 31 is built as an LSI, and the demodulator 33 and decoder 34 are composed of a DSP (Digital Signal Processor). The receiving processor 3, distance calculator 5, comparison decision section 6 and mode controller 7 can be constructed in the form of hardware, or in the form of software operating on a CPU or DSP. Alternatively, they can be constructed as a microcomputer including the memory 4.

Figure 2:
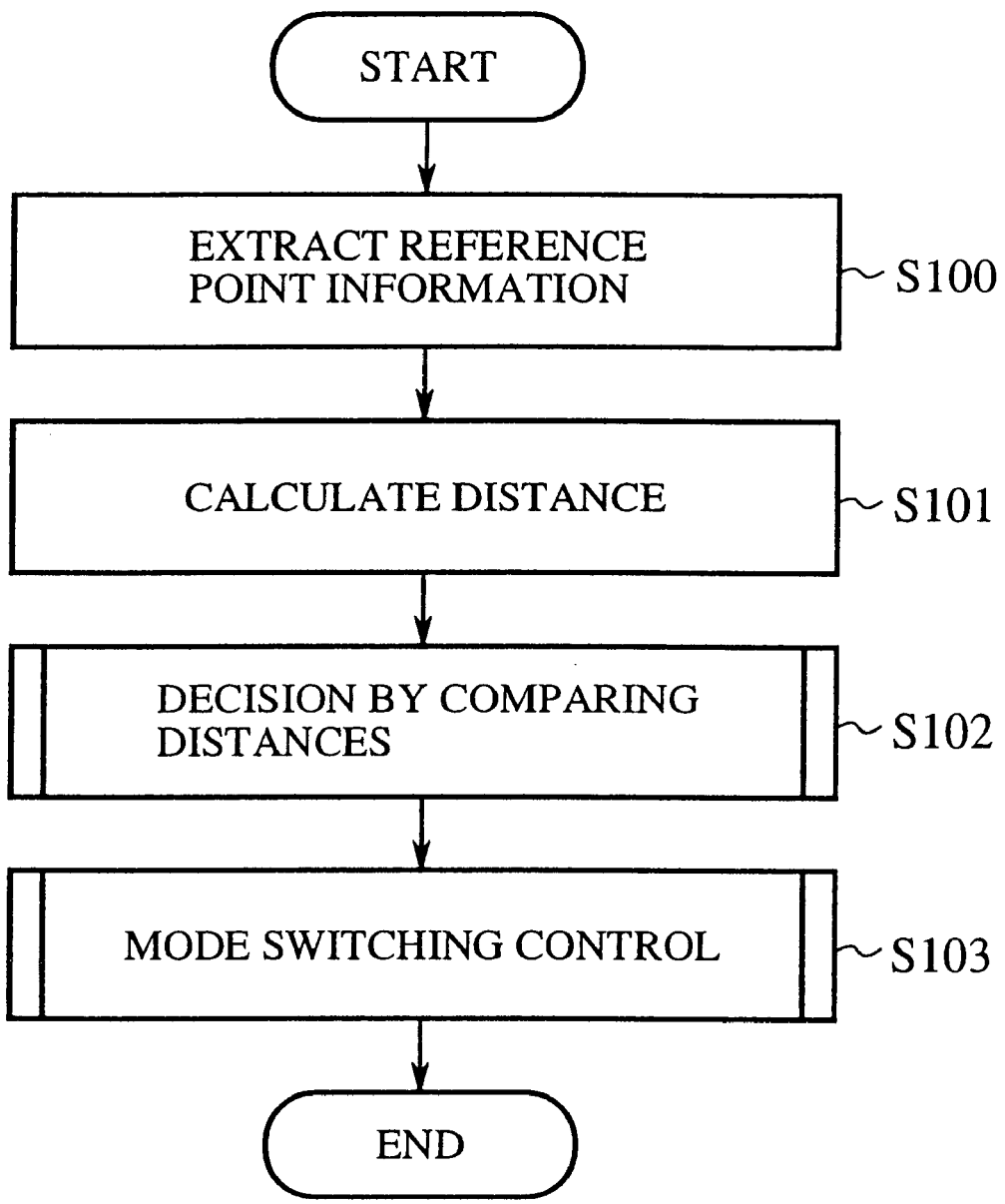
FIG. 2 is a flowchart illustrating an outline of the operation of the mobile communications apparatus 1A as shown in FIG. 1 when receiving system information.

FIG. 2 is a flowchart illustrating the outline of an operation example of the mobile communications apparatus 1A as shown in FIG. 1, that is, the operation when it receives the BCCH including the reference point information. When the mobile communications apparatus 1A receives the BCCH, the receiving processor 3 extracts the reference point information of the visited cell (S100). The distance calculator 5 obtains, from the reference point information extracted and the mobile station information stored in the memory 4, the distance from the mobile communications apparatus 1A to the reference point, and writes the distance obtained into the memory 4 (S101). The comparison decision section 6 compares the current distance obtained by the distance calculator 5 with the previous distance held in the memory (S102).

Figure 3:
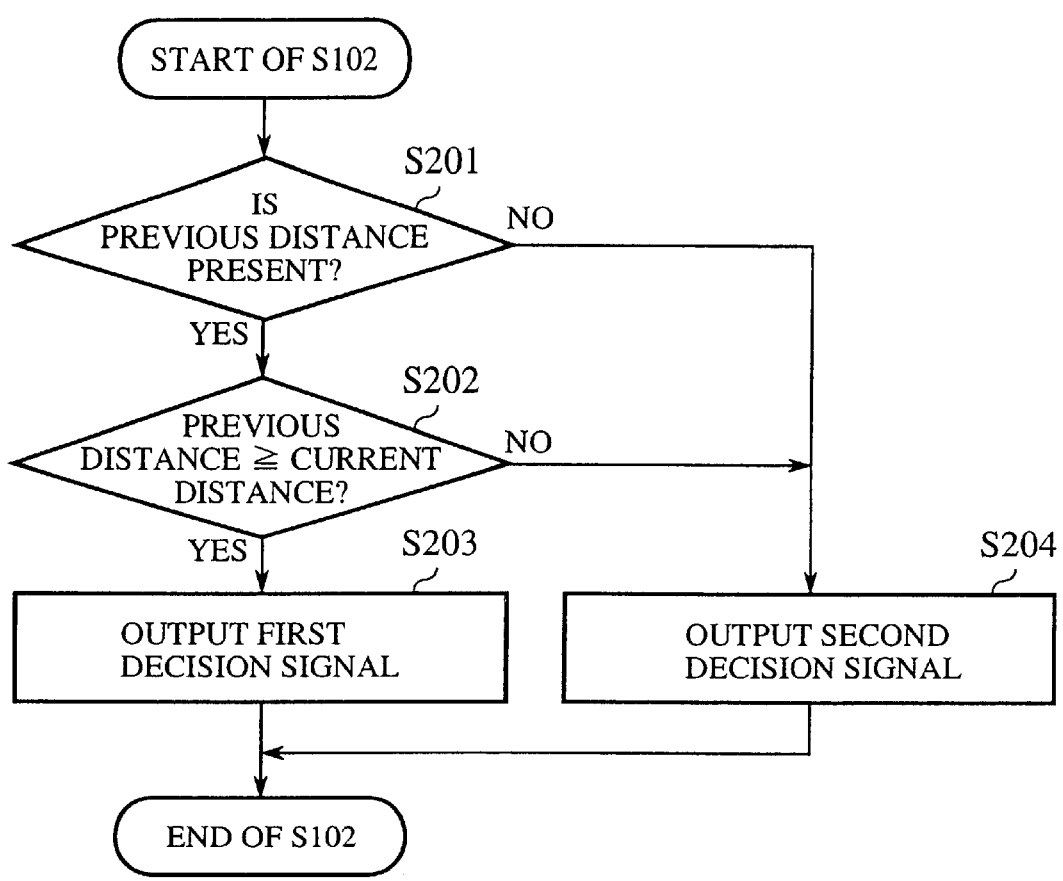
FIG. 3 is a flowchart illustrating the operation in step S102 of FIG. 2 in more detail.

FIG. 3 is a flowchart illustrating the details of the step S102. First, the comparison decision section 6 checks whether the memory 4 holds the previous distance or not (S201). When the previous distance is held, the comparison decision section 6 compares the previous distance with the current distance, and if the current distance is equal to or less than the previous distance, it outputs the first decision signal (S203), and if the current distance exceeds the previous signal, it outputs the second decision signal (S204). If the previous distance is not held in the memory as immediately after the power-up or the handover, the second decision signal is output (S204) because the decision can not be made. The mode controller 7 outputs the mode control signal in response to the decision signal to carry out the mode switching (S103 of FIG. 2).

Figure 4:
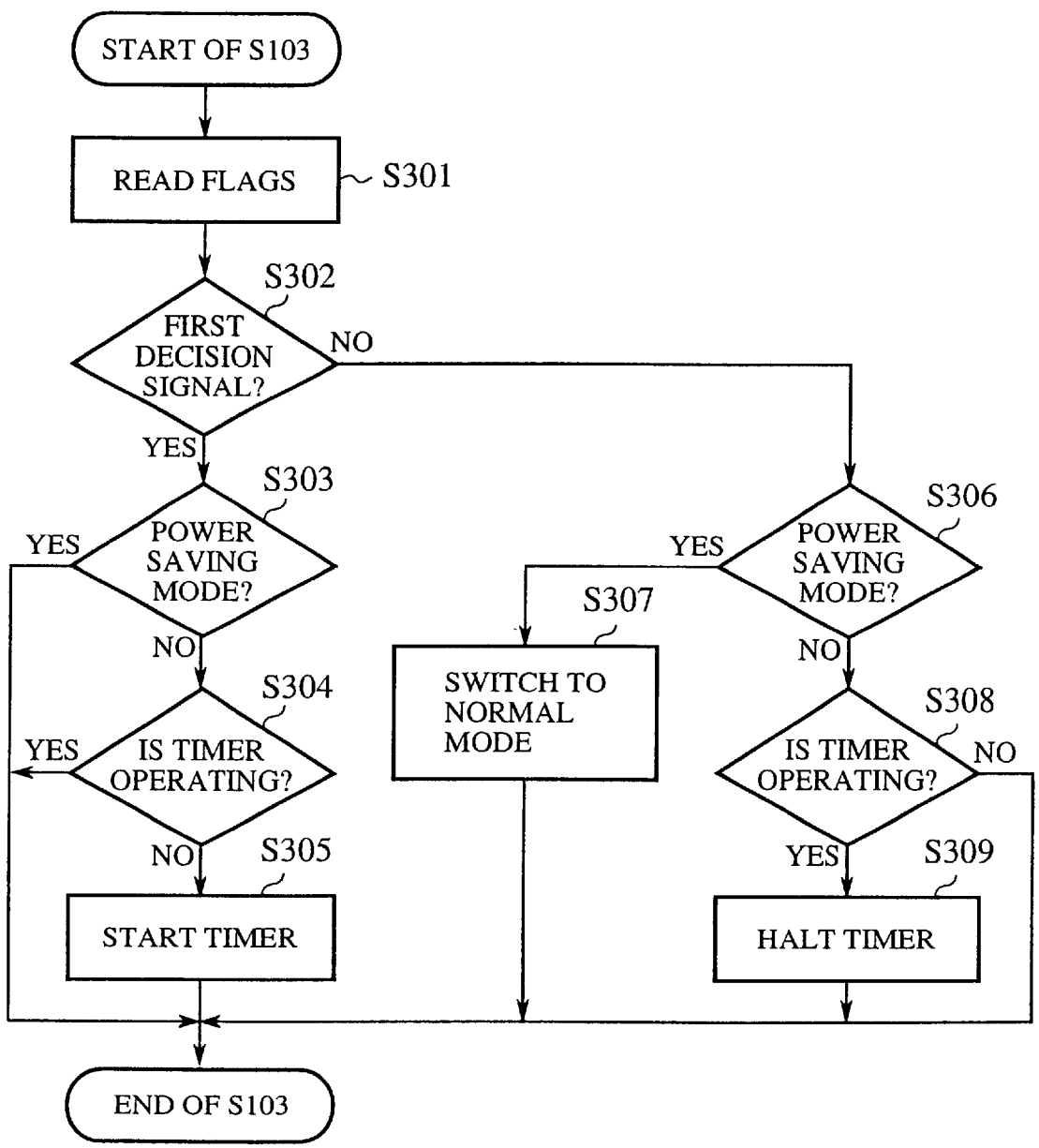
FIG. 4 is a flowchart illustrating the operation in step S103 of FIG. 2 in more detail.

FIG. 4 is a flowchart illustrating the details of the step S103. First, the mode decision section 70 reads the mode flag 72 and the timer flag 73 (S301). The subsequent operation varies depending on the decision signal output from the comparison decision section 6.

First, the operation in response to the first decision signal will be described. In the power saving mode in this case, the processing has nothing to do but to terminate (S302 and S303). On the other hand, in the normal mode, the mode decision section 70 checks the timer flag 73 (S302–S304). If the timer flag indicates "halt", the mode decision section 70 activates the timer 71, and changes the timer flag 73 to "operation" (S305).

Next, the operation in response to the second decision signal will be described. In the power saving mode in this case, the processing is immediately shifted to the normal mode. Specifically, the mode decision section 70 outputs the mode control signal commanding to shift to the normal mode, and changes the mode flag 72 into the "normal mode" (S306 and S307). On the other hand, in the normal mode, the mode decision section 70 checks the timer flag 73 (S306 and S308). If the timer flag 73 indicates "operation", the mode decision section 70 stops the timer 71 and changes the timer flag 73 into "halt" (S309).

Although not shown in these figures, when the timer 71 outputs the time-up signal in the normal mode, the mode decision section 70 changes the mode flag 72 to the "power saving mode" regardless of the receiving operation of the BCCH, and outputs the mode control signal commanding to shift to the power saving mode.

Figure 5:
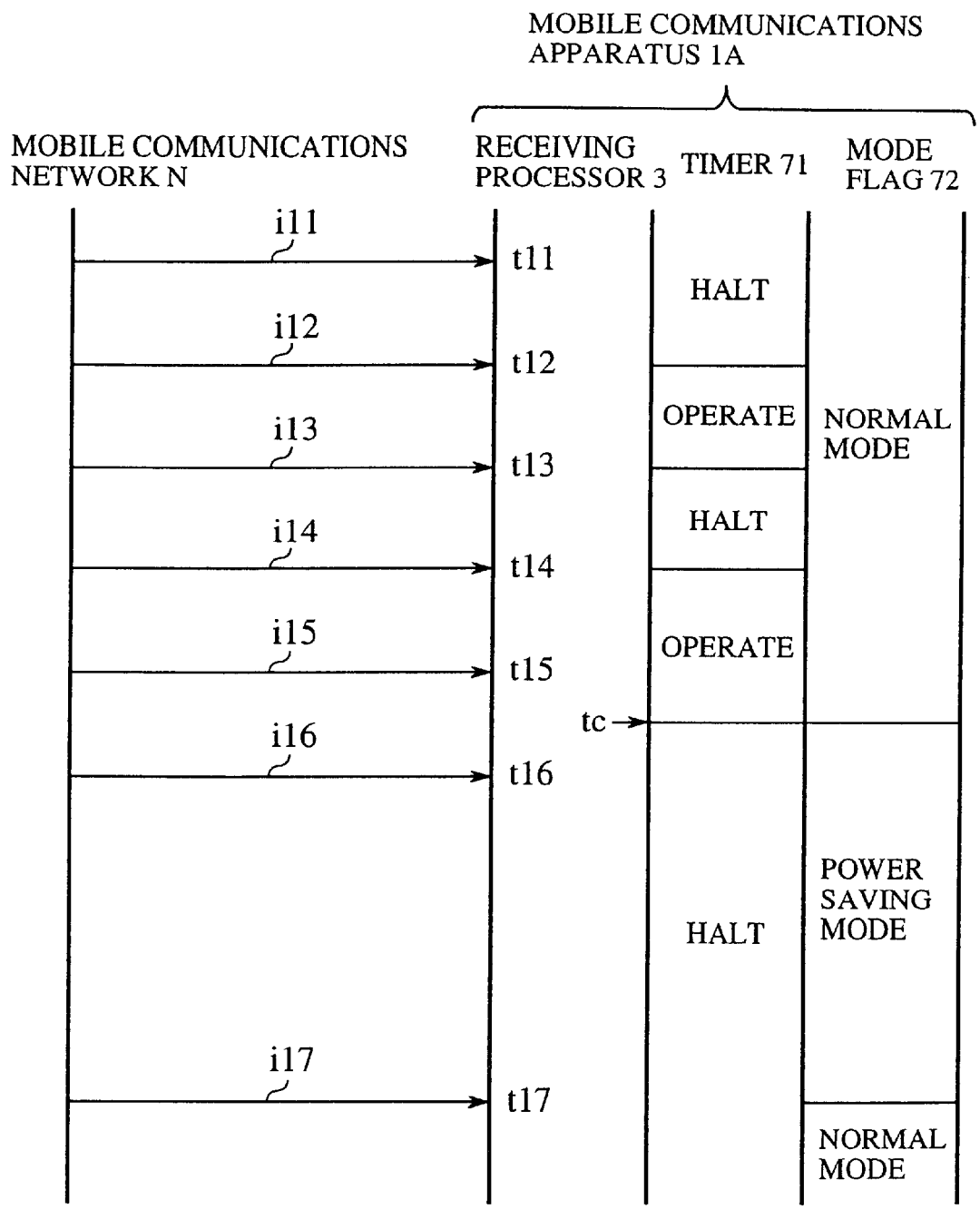
FIG. 5 is a sequence diagram illustrating the processing of the mobile communications apparatus 1A as shown in FIG. 1.

FIG. 5 is a diagram illustrating a processing sequence of the mobile communications apparatus 1A, in which the mobile communications network N and the receiving processor 3, timer 71 and mode flag 72 of the mobile communications apparatus 1A are shown in the horizontal direction, and a time axis is provided in the vertical direction. The time elapses from top to bottom.

The reference symbols i11–i17 each designate system information transmitted from the mobile communications network N to the mobile communications apparatus 1A, and t11–t17 each designate the time at which the receiving processing is carried out. In this case, it is assumed that the distances obtained from the system information i13 and i17 each exceed their previous distances, and the distances obtained from the system information i12 and i14–i16 are equal to or less than their previous distances.

(1) First, immediately after the power-up, the normal mode is established, and the timer 71 is in the halting state. Subsequently, although the receiving processor 3 receives the first system information i11 at time t11, this does not cause the mode switching or the timer control because of the lack of the previous distance.

(2) Second, at time t12, the receiving processor 3 receives the second system information i12. In response to this, the comparison decision section 6 outputs the first decision signal, and the timer 71 is started.

(3) Third, at time t13, the receiving processor 3 receives the third system information i13. In response to this, the comparison decision section 6 outputs the second decision signal, and the timer 71 is halted.

(4) Fourth, at time t14, the receiving processor 3 receives the fourth system information i14. In this case, the timer 71 is restarted in response to the first decision signal.

(5) Next, at time t15, the receiving processor 3 receives the fifth system information i15. Although the comparison decision section 6 continues to output the first decision signal, the timer control is not carried out because the timer 71 has already been set in operation.

(6) Subsequently, at time tc, the timer 71 outputs the time-up signal, in response to which the mode switching to the power saving mode is performed.

(7) Next, at time t16, the receiving processor 3 receives the sixth system information i16. Although the comparison decision section 6 outputs the first decision signal, the timer control is not carried out because the power saving mode has already been established.

(8) Subsequently, at time t17, the receiving processor 3 receives the seventh system information i17. In response to this, the comparison decision section 6 outputs the second decision signal so that the mode switching to the normal mode is carried out.

According to the present embodiment, the mobile communications apparatus 1A can detect the changes in the distance from the reference point in the visited cell, make a decision on the basis of the detection result as to whether the shift conditions to the power saving mode are fulfilled or not, and decide the shift to the power saving mode.

In other words, the mobile communications apparatus 1A makes a decision as to whether it moves toward the inside (center) or toward the outside (boundary) of the visited cell, and shifts to the power saving mode when it moves toward the inside. Accordingly, it makes a transition to the power saving mode when the possibility of departing from the cell is small, and shifts to the normal mode when the possibility of leaving the cell is high.

Furthermore, the mode controller 7 comprises the timer 71 so that the transition to the power saving mode is carried out only when a decision is made that the transition condition to the power saving mode continues over the predetermined time period. This makes it possible for the mobile communications apparatus to prevent the oscillation between the normal mode and the power saving mode.

The variable control of the intermittent ratio in this way based on the direction of the relative movement of the mobile communications apparatus in the visited cell has an advantage of being able to receive the system information at sufficient frequency with reducing the power consumption. In addition, reducing the intermittent ratio only when the predetermined moving direction is detected over the predetermined time period offers an advantage of being able to avoid the fluctuations in the intermittent ratio, thereby preventing the failure in receiving the system information.

Although the mode controller 7 comprises the time flag 73 in the present embodiment, this is not essential. For example, the flag 73 is unnecessary if the timer 71 is configured such that it ignores the start signal supplied during the operation state and the halt signal supplied during the halt state.

In addition, although the switching is carried out between the two modes consisting of the normal mode and the power saving mode in the present embodiment, the switching can also be performed between three or more modes with different intermittent ratios.

EMBODIMENT 2

Figure 6:
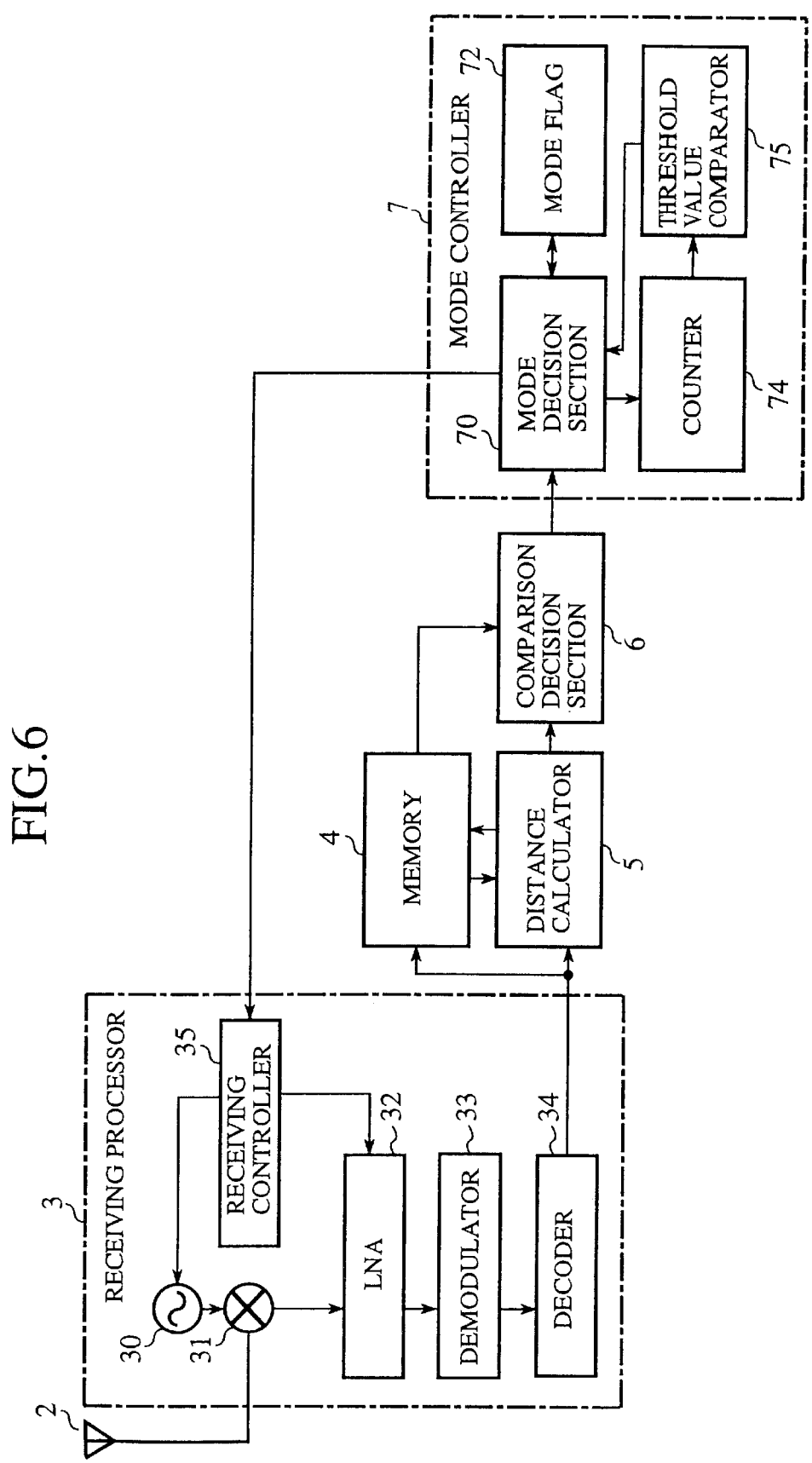
FIG. 6 is a block diagram showing an embodiment 2 of a mobile communications apparatus 1B in accordance with the present invention.

FIG. 6 is a block diagram showing a second embodiment of the mobile communications apparatus in accordance with the present invention. The mobile communications apparatus 1B comprises in the mode controller 7 a counter 74 and a threshold value comparator 75 instead of the timer 71 and the timer flag 73. In FIG. 6, the components corresponding to those of FIG. 1 are designated by the same reference numerals, and the description thereof is omitted here.

The mode decision section 70 controls the counter 74 in response to the output of the comparison decision section 6. Specifically, the mode decision section 70 supplies the counter 74 with a count signal when the first decision signal is output, and with a clear signal when the second decision signal is output.

The counter 74 counts the count signal fed from the mode decision section 70, and supplies the count value to the threshold value comparator 75. The count value of the counter 74 is cleared to zero in response to the clear signal fed from the mode decision section 70.

The threshold value comparator 75 compares the count value supplied from the counter 74 with a predetermined threshold value, and outputs a count-out signal when the count value becomes equal to or greater than the threshold value.

The mode decision section 70 switches the operation mode to the power saving mode in response to the count-out signal supplied in the normal mode, and to the normal mode in response to the second decision signal supplied in the power saving mode. In the mode switching, the mode decision section 70 writes the new mode into the mode flag 72, and supplies the receiving controller 35 with the mode control signal.

As the counter 74, either an up-counter or down-counter can be employed which increments or decrements its count value by one in response the count signal. In the down-counter, the threshold value comparator 75 outputs the count-out signal when the count value becomes equal to or less than the threshold value.

A flowchart illustrating the outline of an operation example of the mobile communications apparatus 1B will be the same as that of FIG. 2. Besides, the flowchart illustrating the details of the step S102 of FIG. 2 is the same as that of FIG. 3.

Figure 7:
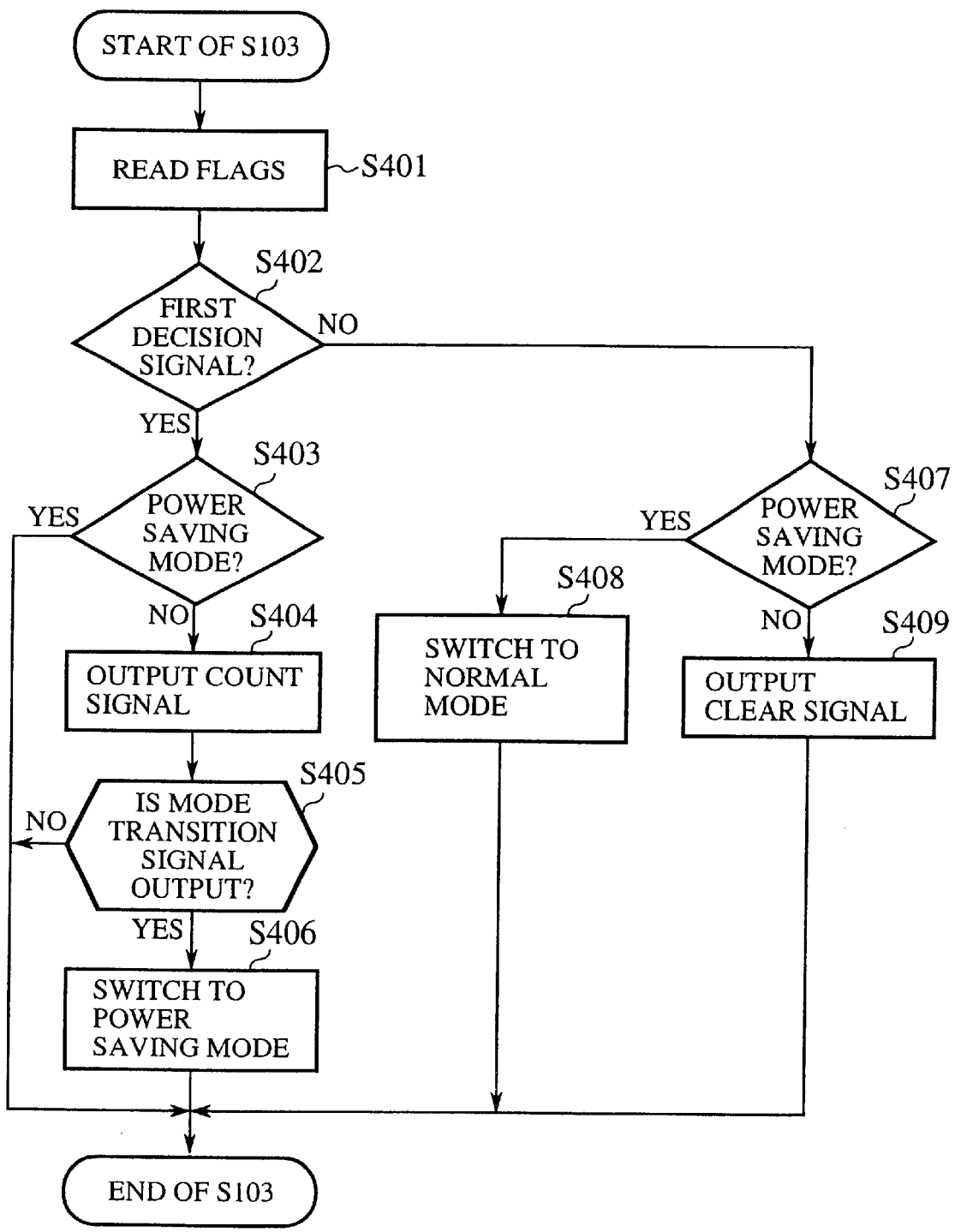
FIG. 7 is a flowchart illustrating the operation in step S103 of FIG. 2 in more detail.

FIG. 7 is a flowchart illustrating the details of the step S103 of FIG. 2. First, the mode decision section 70 reads the mode flag 72 (S401). The subsequent operation varies depending on the decision signal output from the comparison decision section 6.

First, the operation in response to the first decision signal will be described. In the power saving mode in this case, the processing has nothing to do but to terminate (S402 and S403). On the other hand, in the normal mode, the mode decision section 70 outputs the count signal, and the counter 74 counts it up (S402–S404). If the threshold value comparator 75 outputs the count-out signal in response to the count up, the switching to the power saving mode is performed. Specifically, the mode decision section 70 outputs the mode control signal commanding to shift to the power saving mode, and changes the mode flag 72 to the "power saving mode" (S405 and S406).

Next, the operation in response to the second decision signal will be described. In the power saving mode in this case, the processing is immediately shifted to the normal mode (S407 and S408). Specifically, the mode decision section 70 outputs the mode control signal commanding to shift to the normal mode, and changes the mode flag 72 into the "normal mode". On the other hand, in the normal mode, the mode decision section 70 outputs the clear signal, and clears to zero the count value of the counter 74 (S407 and S409).

Figure 8:
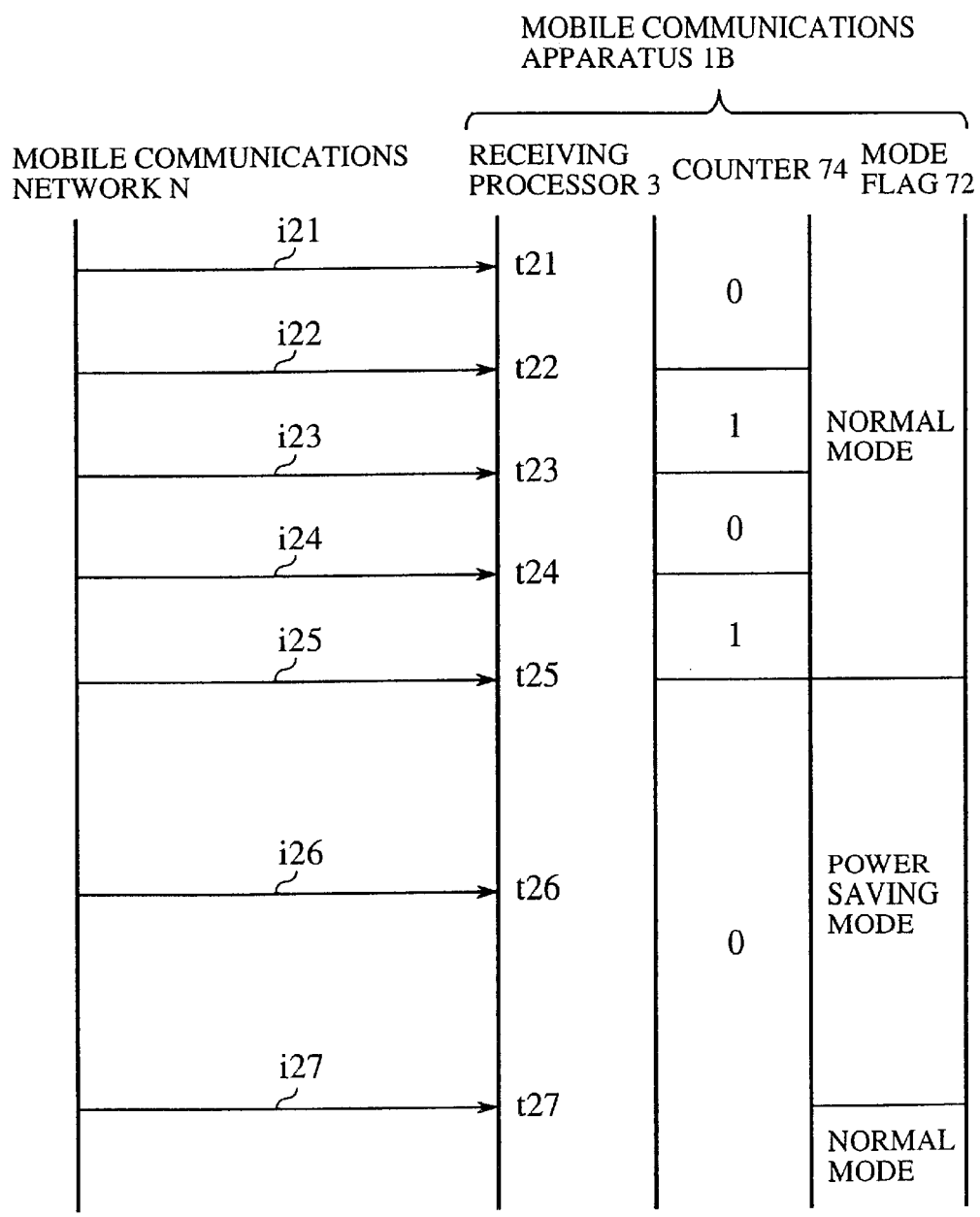
FIG. 8 is a sequence diagram illustrating the processing of the mobile communications apparatus 1B as shown in FIG. 6.

FIG. 8 is a diagram illustrating a processing sequence of the mobile communications apparatus 1B, in which the mobile communications network N and the receiving processor 3, counter 74 and mode flag 72 of the mobile communications apparatus 1B are shown in the horizontal direction, and a time axis is provided in the vertical direction. The time advances from top to bottom.

The reference symbols i21–i27 each designate system information transmitted from the mobile communications network N to the mobile communications apparatus 1B, and t21–t27 each designate the time at which the receiving processing is carried out. In this case, it is assumed that the distances obtained from the system information i23 and i27 each exceed their previous distances, and the distances obtained from the system information i22 and i24–i26 are equal to or less than their previous distances, and that the threshold value of the threshold value comparator 75 is "2".

(1) First, immediately after the power-up, the normal mode is established, and the count value of the counter 74 is zero. Subsequently, although the receiving processor 3 receives the first system information i21 at time t21, this does not cause the mode switching or the counter control because of the lack of the previous distance.

(2) Second, at time t22, the receiving processor 3 receives the second system information i22. In response to this, the comparison decision section 6 outputs the first decision signal, and the count value of the counter 74 becomes one.

(3) Third, at time t23, the receiving processor 3 receives the third system information i23. In response to this, the comparison decision section 6 outputs the second decision signal, and the count value of the counter 74 is cleared to zero.

(4) Fourth, at time t24, the receiving processor 3 receives the fourth system information i24. In this case, the count value of the counter 74 becomes to one again in response to the first decision signal.

(5) Next, at time t25, the receiving processor 3 receives the fifth system information i25. In this case, the count value of the counter 74 becomes two in response to the first decision signal fed from the comparison decision section 6, and the threshold value comparator 75 outputs the count-out signal, in response to which the mode switching is carried out to the power saving mode. The count value of the counter 74 is cleared to zero.

(6) Subsequently, at time t26, the receiving processor 3 receives the sixth system information i26. Although the comparison decision section 6 outputs the first decision signal, the counter control is not carried out because the power saving mode has already been established.

(7) Next, at time t27, the receiving processor 3 receives the seventh system information i27. In response to this, the comparison decision section 6 outputs the second decision signal so that the mode switching to the normal mode is carried out.

According to the present embodiment, the mode controller 7 comprises the counter 74 so that the transition to the power saving mode is carried out when a decision is made that the transition condition to the power saving mode is consecutively satisfied over a predetermined number of times. This make is possible for the mobile communications apparatus to prevent the oscillation between the normal mode and power saving mode.

The control of reducing the intermittent ratio only when the predetermined moving direction is detected consecutively over the predetermined number of times offers an advantage of being able to avoid the fluctuations in the intermittent ratio, thereby preventing the failure in receiving the system information needed.

In particular, because the geographic location of the cells always varies in a satellite communications system in which mobile satellites construct cells, the system information must be acquired even if the mobile communications apparatus is at rest. Accordingly, the consumption power can be efficiently saved by applying the present invention.

What is claimed is:

1. A mobile communications apparatus comprising:

a receiving processor for intermittently receiving a radio signal, and for extracting from the radio signal location information about a reference point in a visited cell;

a distance calculator for obtaining a distance from the mobile communications apparatus to the reference point;

a distance comparator for comparing distances obtained by said distance calculator; and an intermittent ratio controller for controlling an intermittent ratio of said receiving processor in response to an output of said distance comparator.

2. The mobile communications apparatus according to claim 1, wherein said intermittent ratio controller reduces the intermittent ratio of said receiving processor when said distance comparator outputs a signal indicative of reduction in the distance over a predetermined time period.

3. The mobile communications apparatus according to claim 2, wherein said intermittent ratio controller further comprises a timer which is activated by the signal indicative of the reduction in the distance supplied from said distance comparator, and is reset by a signal indicative of an increase in the distance, and wherein said intermittent ratio controller controls the intermittent ratio of said receiving controller in response to the time-up signal.

4. The mobile communications apparatus according to claim 1, wherein said intermittent ratio controller reduces the intermittent ratio of said receiving processor when said distance comparator outputs a signal indicative of a reduction in the distance at a predetermined consecutive number of times.

5. The mobile communications apparatus according to claim 4, wherein said intermittent ratio controller further comprises a counter which counts the signal indicative of the reduction in the distance supplied from said distance comparator and is reset in response to the signal indicative of an increase in the distance, and a threshold value comparator for comparing a count value of said counter with a predetermined threshold, and wherein said intermittent ratio controller controls the intermittent ratio of said receiving controller in response to an output of said threshold value comparator.

6. The mobile communications apparatus according to claim 1, wherein said receiving processor extracts from the radio signal location information of said mobile communications apparatus, and said distance calculator obtains, from the location information of said mobile communications apparatus extracted, the distance to the reference point.

7. An intermittent receiving control method comprising:

a receiving step of intermittently receiving a radio signal;

an extracting step of extracting, from the radio signal received, location information about a reference point in a visited cell;

a distance obtaining step of obtaining a distance from a mobile communications apparatus to the reference point;

a distance comparing step of comparing distances obtained by said distance obtaining step; and an intermittent ratio controlling step of controlling an intermittent ratio of said receiving step in response to a comparing result.

8. The intermittent receiving control method according to claim 7, further comprising a second extracting step of extracting, from the radio signal received, location information of said mobile communications apparatus, wherein said distance calculating step obtains, from the location information of said mobile communications apparatus extracted, the distance to the reference point.

* * * * *